July 8, 1930.  P. J. SIMONES  1,770,089
CHECKING MECHANISM FOR ADDING MACHINES
Filed June 14, 1929   6 Sheets-Sheet 1

Inventor
Paul J. Simones
By Bair, Freeman & Sinclair
Attorneys

July 8, 1930.  P. J. SIMONES  1,770,089
CHECKING MECHANISM FOR ADDING MACHINES
Filed June 14, 1929     6 Sheets-Sheet 5

Inventor
Paul J. Simones
by Bair, Freeman & Sinclair
Attorneys

July 8, 1930.    P. J. SIMONES    1,770,089
CHECKING MECHANISM FOR ADDING MACHINES
Filed June 14, 1929    6 Sheets-Sheet 6

Inventor
Paul J. Simones
by Bair, Freeman & Sinclair
Attorneys

Patented July 8, 1930

1,770,089

UNITED STATES PATENT OFFICE

PAUL J. SIMONES, OF DUBUQUE, IOWA

CHECKING MECHANISM FOR ADDING MACHINES

Application filed June 14, 1929. Serial No. 370,760.

The object of my invention is to provide a checking mechanism for adding machines of simple, durable and comparatively inexpensive construction.

A further object is to provide such a mechanism for the purpose of checking numbers being added on the adding machine, the mechanism being adaptable for arrangement in the form of an attachment or built into the adding machine itself when it is assembled.

More particularly, it is my object to provide a checking mechanism which uses a certain system which I have developed for the checking of problems during addition, the system itself being also capable of checking subtraction, multiplication and division problems.

When the system is used in connection with the checking mechanism herein disclosed, every bill, statement, invoice or any paper bearing an amount to be added on the adding machine will also bear a check number of small denomination and the checking mechanism is arranged so that a primary check mechanism is provided, which automatically operates a dial for showing the check number of any amount entered on the machine by pressing the amount key thereof and a manual check mechanism is provided in which manually operated check keys are utilized for operating a dial, the checking keys being manipulated according to the check number appearing on the bill, statement or other paper from which the amount is being taken.

A means is provided to lock the adding bar of the adding machine unless the two check dials (the primary check dial and the manual check dial) are in registry. Thus, if a mistake is made in pressing either the amount keys or the checking keys, the two dials will not register and the adding bar of the adding machine cannot be depressed for adding the amount entered on the machine.

The operator will then immediately know that a mistake has just been made and he can correct it.

A further object is to provide means for correcting the mistake whether the mistake has been made in the amount entered on the adding machine or the keys pressed.

In connection with the system I have developed and for which I have designed the checking mechanism herein-illustrated, let us assume that an operator makes one mistake in one hundred entries. By making it necessary to enter on the adding machine and the mechanism both the amount of the bill and a check number and designing the checking mechanism so that it locks the adding bar unless these two numbers are entered properly, the percentage of mistakes is considerably reduced because it is not nearly so probable that a mistake will be made in both the amount and the checking number entered on the adding machine and the checking mechanism.

Thus, the proportion of mistakes to entries may be removed as far as possibly one mistake in one thousand entries.

In the system I have developed, the checking number of any particular amount key on the adding machine is considerably at variance with the actual value of the amount indicated on such key. For instance, one of "7" keys has a check number of "13" and an "8" in the same column has a check number of "10". Therefore, if the "8" key is erroneously pressed instead of the "7" key, and then such a mistake were made in the check number as to get the automatic check dial and the manual check dial to register and thus pass up a mistake, the mistake made in pressing the checking key would have to be the pressing of "10" instead of a "13", which is three digits removed from "10". Making such a mistake is highly improbable so that the checking system used in the mechanism illustrated in my drawings reduces the likelihood of making the kind of mistake that can be passed up without locking the adding bar of the adding machine to practically zero.

A further object is to provide means for rendering the checking mechanism inoperative when it is desired to use the adding machine without the checking mechanism.

Still a further object is to provide means for determining a check number while adding a column without disturbing the balance between the adding machine and the checking mechanism so that the the proper amounts can continue to be added in the column and the manual checking mechanism can be actuated for the purpose intended without locking the adding bar of the adding machine.

The necessity for determining a check number while adding a column may arise from a check number having been put down erroneously on the bill originally. In this connection it may be mentioned that every bill or other paper when the amount is written thereon, is taken to the adding machine and the amount entered on the amount keys of the adding machine with the checking mechanism in operative position, whereby the proper check number for that amount may be determined on the primary check dial. Any mistake in writing the check number on the bill will be later caught when adding a plurality of bills, as the adding bar of the adding machine will immediately lock when the wrong check number is entered on the checking keys.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

On the accompanying drawings, I have used the reference character A to indicate generally, an adding machine having sliding amount keys. Patent No. 1,342,459, issued June 8, 1920, shows another form of adding machine having sliding amount keys with which my checking mechanism may coact in a similar manner to the one illustrated on my drawings. The checking machine is indicated generally by the reference character C and includes a base portion 20 forming a base for the checking machine C and extended under the adding machine A to form a sub-base therefor.

The adding machine A is illustrated as having an upwardly depressed bottom 22 into which a flange 24 of the sub-base of the checking machine C extends. The adding machine A merely rests on the sub-base of the checking machine C and is properly aligned relative thereto by the flange 24.

The checking machine C includes a motor 26 for operating the mechanism thereof and the circuit for the motor 26 may be selectively controlled by a switch 28. The switch 28 is provided with an operating handle 30 mounted on the forward end of the checking machine C.

The switch arm 30 is secured to a switch shaft 32 to which is secured an arm 34. The arm 34 is operatively connected by a link 36 to a substantially rectangular-shaped lever 38. The lever 38 is pivoted at 40 to ears 42 extending upwardly from the base 20 of the checking machine C. The lever 38 is operatively connected with a bracket 44 secured to the bottom 22 of the adding machine A by a link 46 pivoted at its ends to the lever 38 and bracket 44.

Primary checking mechanism

The primary checking mechanism consists of individual check operating levers $9^a$, $9^b$, $9^c$, $8^a$, etc., * * * $1^b$, and $1^c$, operatively associated with the amount keys 9′, 9″, 9‴, 8′, etc., * * * 1′ and 1‴, of the adding machine A.

Each check operating lever is provided with a head 48 mounted directly below the proper amount key of the adding machine and the lever extends downwardly from the head 48 and then toward the right hand side of the checking machine and terminates in a stop lug 50. The heads 48 may be engaged by the sliding type of amount key shown or the swinging type of Patent No. 1,270,471 issued June 25, 1918.

A catch notch 52 is formed adjacent the stop lug 50 on each check operating lever. Each check operating lever is provided with a perforated ear 54 pivotally mounted on a pin 56. Three of the pins 56 are provided and they are supported by brackets 58 extending upwardly from the base 20 of the checking machine.

It will be noted that the ears 54 are in different vertical planes, the purpose of which is to equalize the unequal leverage which would be encountered if all the ears 54 were in a single vertical plane, since the upstanding ends of the check operating levers terminating in the heads 48 are in different vertical planes for alignment purposes with respect to the amount keys of the adding machine.

The casing of the checking machine may consist of three separate parts, as clearly shown in the sectional views of the drawings and having partitions 60 and 62 forming three compartments 64, 66 and 68. The bottom of the compartment 64 may be open and provided with a cover plate 70.

Within the compartment 66 a plurality of primary stop levers $F^1$, $F^2$, etc., * * * $F^{16}$, are provided. The stop levers are each pivoted to a single shaft 72 supported by ears 74 extending upward from the partition 60.

The check operating levers are mounted below the partition 60 and consequently below the primary stop levers F and each check operating lever is provided with an upstanding resilient arm 76. The arms 76 project upwardly through an opening formed in the partition 60. The arms 76 are arranged to contact with the lower surfaces of the primary stop levers F when the amount keys of the adding machine are pressed downwardly.

Figure 3:
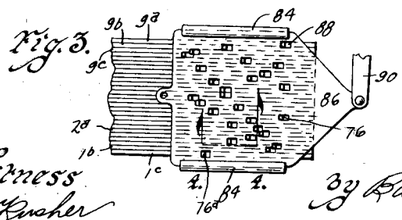
Figure 3 is a sectional view on the line 3—3 of Figure 2.

It will be noted that the arms 76 are arranged in quite an irregular fashion (see Figure 3). This is so that the arm 76 raised by depressing the amount key 9′ of the adding machine will raise the primary stop lever $F^2$; 9″ will raise $F^7$; 9‴ will raise $F^{16}$; 8′ will raise $F^{15}$, etc., as can be determined by the chart shown in Figure 19.

Figures 2, 4:
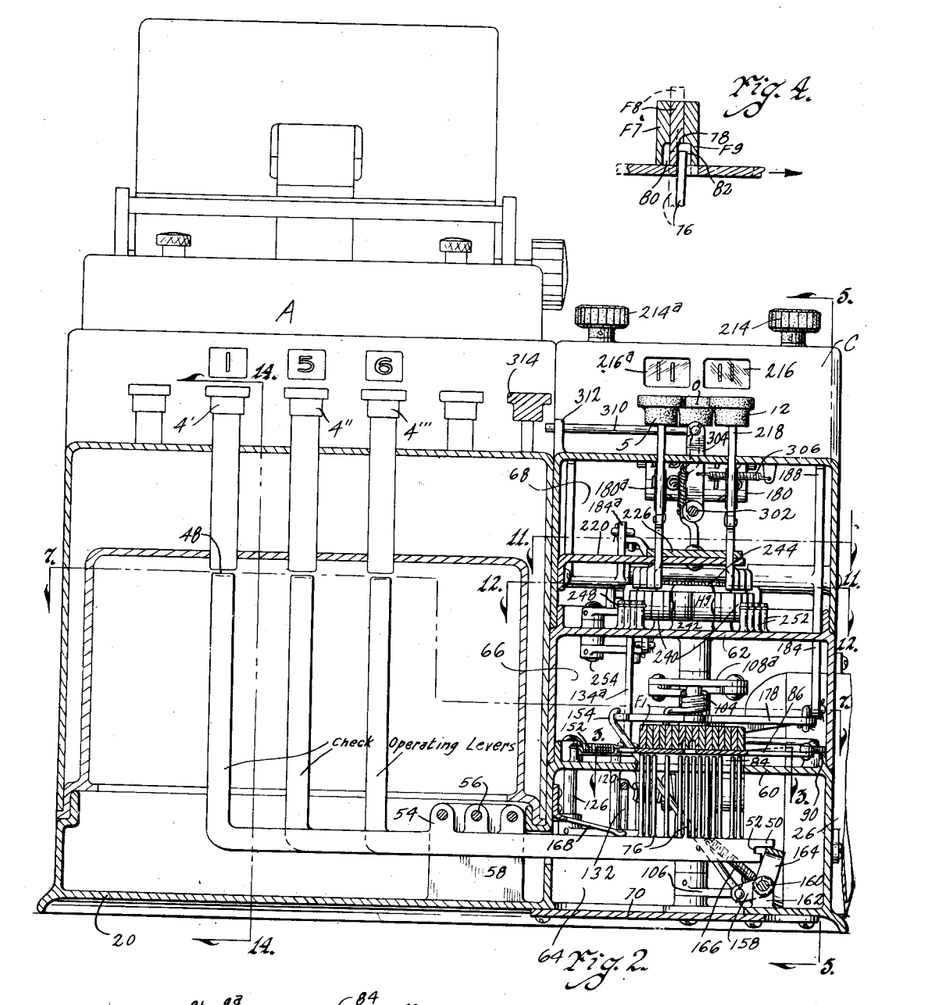
Figure 2 is an enlarged sectional view on the line 2—2 of Figure 1.
Figure 4 is a sectional view on the line 4—4 of Figure 3.

Each primary stop lever F is provided with a notch 78, as for instance, in the lever $F^8$ shown in Figure 4, and the arm 76 for that particular stop lever is normally in alignment with the shoulder thus left. This shows somewhat more clearly in Figure 2, Figure 4 showing different operative positions.

The next lever to the left ($F^7$) is provided with a notch 80 and the next lever to the right ($F^9$) is provided with a notch 82. The purpose of these notches will be fully set forth in the explanation of the operation of my mechanism later on in the specification.

A pair of guides 84 extend upwardly from the partition 60 and slidably support a trip plate 86. The trip plate 86 is provided with a slot 88 directly above the upper end of each arm 76. Normally, the arms 76 terminate below the plate 88, but when an amount key of the adding machine is depressed, the corresponding arm 76 will be raised upwardly through its respective slot 88 in the trip plate 86 before engaging its respective primary stop lever F.

The trip plate 86 is operatively connected to a trip lever 90. The trip lever 90 is pivoted as indicated at 92 to a boss extending upwardly from the partition 60.

A primary dial actuating arm 94 is pivotally mounted on a vertical shaft 96 rotatably supported in a bearing 98, which in turn is supported on the partition 60. A lost motion connection is provided between the arm 94 and the shaft 96 by means of slots 100 formed in a hub on the arm 94 and a pin 102 extending through the shaft 96 and having its ends projecting into the notches 100. (See Figures 5 and 17.)

A spring 104 operatively connects the primary dial actuating arm 94 with the shaft 96 so that the pin 102 is normally kept against one end of each slot 100, but in the event an obstruction is placed in the way of the arm 94 the arm will stop, while the shaft 96 continues to rotate.

Figures 7, 8:
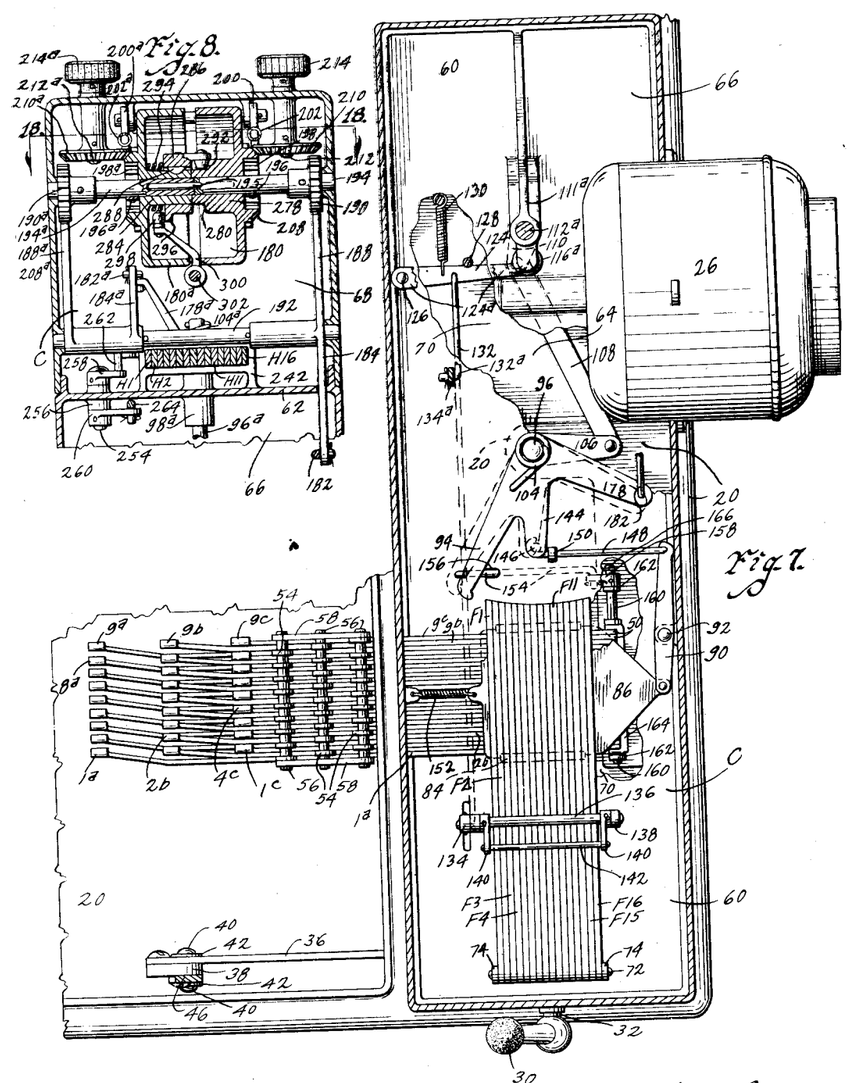
Figure 7 is a sectional view on the line 7—7 of Figure 2, showing a plan view of the primary check mechanism.
Figure 8 is a sectional view on the line 8—8 of Figure 5, illustrating the construction of the primary and manual check dials.

The shaft 96 is rotated or rather rocked through a portion of a revolution and then returned to its original position shown in Figure 7 by means of a lever 106, link 108 and crank arm 110. The crank arm 110 is secured to a shaft 112 to which is also secured a clutch device consisting of a hub 114 and a spring pressed pin 116. The pin 116 is normally constrained by its spring to enter one of a plurality of openings 118 formed in a worm gear 120 rotatably mounted on the shaft 112.

The worm gear 120 is driven by a worm 122 mounted on the shaft of the motor 26. The pin 116 is normally prevented from entering one of the openings 118 by a clutch lever 124.

Figures 1, 9, 10:
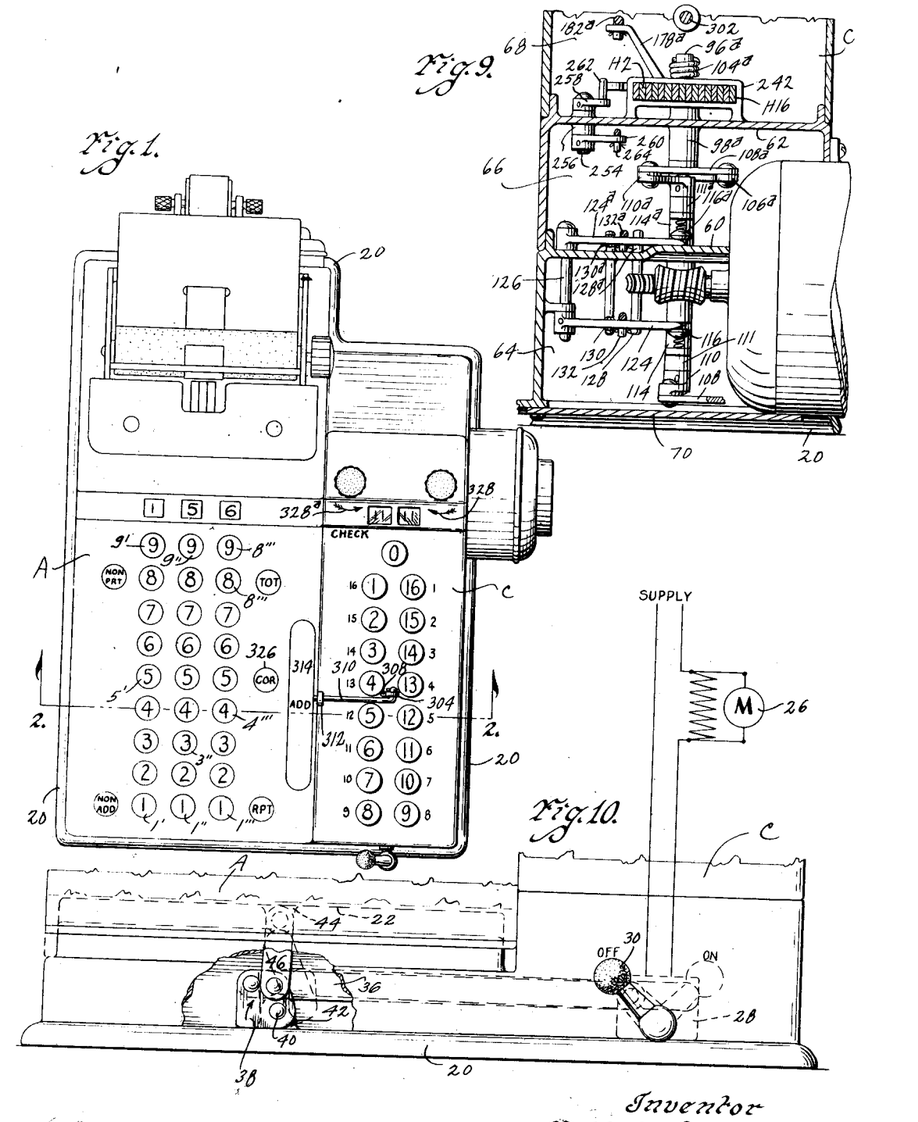
Figure 1 is a plan view of an adding machine showing my checking mechanism associated therewith in the form of an attachment having a sub-base for the adding machine.
Figure 9 is a sectional view on the line 9—9 of Figure 5, illustrating clutch devices for the primary and manual check mechanisms.
Figure 10 is a front elevation of the lower portion of the checking mechanism and adding machine, parts of the checking mechanism being broken away to show a means for rendering the checking mechanism selectively operative or inoperative relative to the adding machine.

The end of the clutch lever 124 adjacent the pin 116 as best shown in Figure 9, is pointed. The clutch lever itself is freely pivoted on a pin 126 and normally constrained to engage a stop 128 due to the action of the spring 130. The clutch lever 124 is operatively connected by means of a rod 132 to a lever 134 secured to a shaft 136. The shaft 136 is journaled in bearings 138 extending upwardly from the partition 60.

Figures 5, 6:
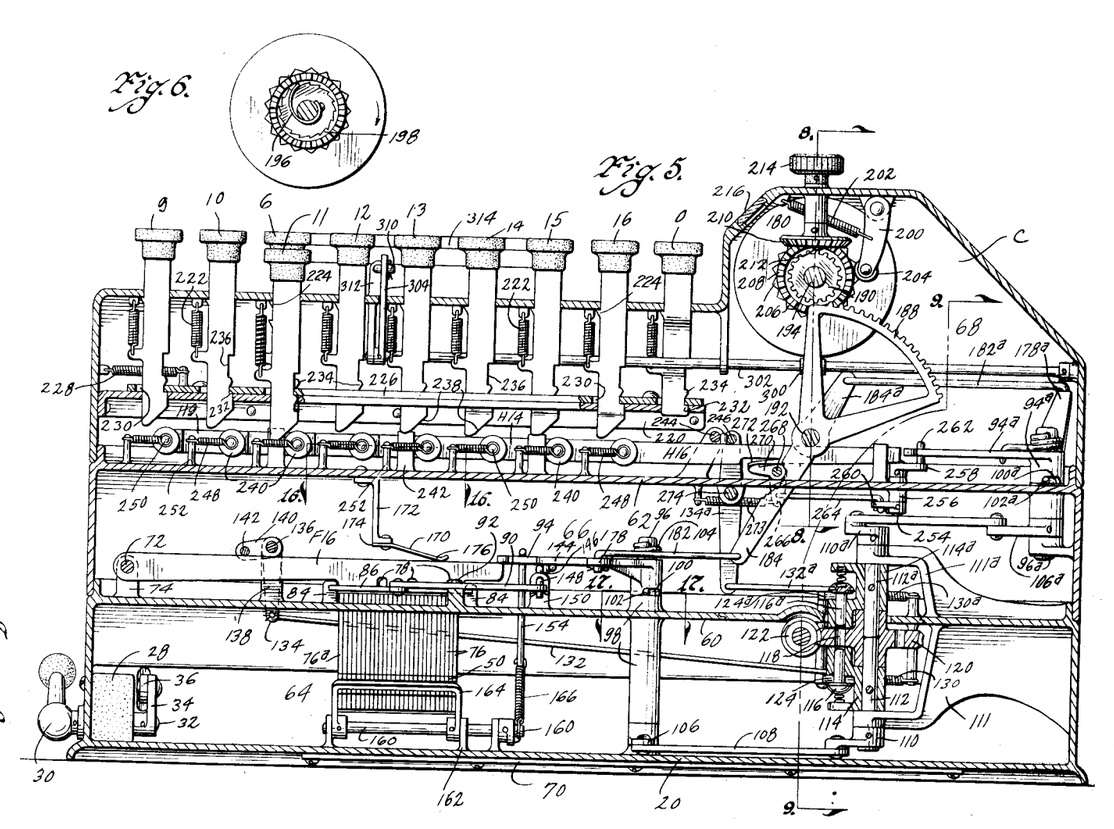
Figure 5 is a vertical sectional view on the line 5—5 of Figure 2, illustrating the entire mechanism of the checking device.
Figure 6 is a side elevation of the primary check dial showing a ratchet connection.

A pair of arms 140 are secured to the shaft 136 and are connected by a rod 142 extending across the primary stop levers F, as clearly shown in Figures 5 and 7. Thus, it will be seen that when any of the primary stop levers F are raised, the clutch lever 124 will be pulled from under the head of the pin 116, thereby allowing it to engage in one of the openings 118 in the worm gear 120 and rotate therewith. When the hub 114 of the clutch has rotated one revolution and the clutch lever 124 is back in position, the pointed end thereof will engage under the head of the pin 116 for again withdrawing it from the opening 118, whereby the crank arm 110 rotates but one revolution and thereby oscillates the shaft 96 in one direction a predetermined distance and then returns it to its original position.

From the description of the parts just described, it will be remembered that the raising of any of the primary stop levers F operates the clutch lever 124, whereby the clutch causes oscillation of the primary dial actuating arm 94 through the medium of the spring 104. If the lever F¹¹ for instance, is raised, then the arm 94 will swing toward the right, as viewed in Figure 7 and strike the lever F¹¹, whereupon the arm 94 will be stopped, but the shaft 96 will continue in its movement and upon returning, the edge of the notch 100 will engage the pin 102 for returning the arm 94 to its original position.

Formed integrally with the primary dial actuating arm 94 is an arm 144 having a downwardly extending pin 146. The pin 146 is adapted to engage a hooked rod 148 slidably mounted in a bearing 150 and operatively connected with the trip lever 90 for the purpose of moving the trip plate 86. The trip plate 86 is thus moved against the opposition of a spring 152.

The primary dial actuating arm 94 in its return to normal position also engages a hooked rod 154 extending downwardly through a slot 156 in the partition 60 and connected with an arm 158 secured to a lock shaft 160. The lock shaft 160 is journaled in bearings 162 extending upwardly from the base 20 of the checking machine and has secured to it an inverted U-shaped lock bar 164.

The lock bar 164 is adapted to engage under the stop lock 50 to act as a stop therefor when the lock bar is in one position and to engage in the notch 52 when in another position to act as a lock for the check operating levers during certain steps in the operation of the checking machine. The lock bar 164 is normally constrained to assume the position shown in Figure 2 due to the action of a spring 166 having its ends connected with the shaft 160 and the rod 154 for holding the hooked end of the rod in engagement with the primary dial actuating arm 94 in its normal position.

The spring 166 also normally causes the rod 154 to engage the right hand end of the slot 156 when free to do so.

The check operating levers are normally constrained to the position illustrated in Figure 2 by a leaf spring device 168. The primary stop levers F are normally constrained to the position shown in Figure 5 by a somewhat similar leaf spring device 170 supported on a bracket 172 extending downwardly from the partition 162.

Figures 13, 14, 15, 16, 17, 18, 19, 20, 21:
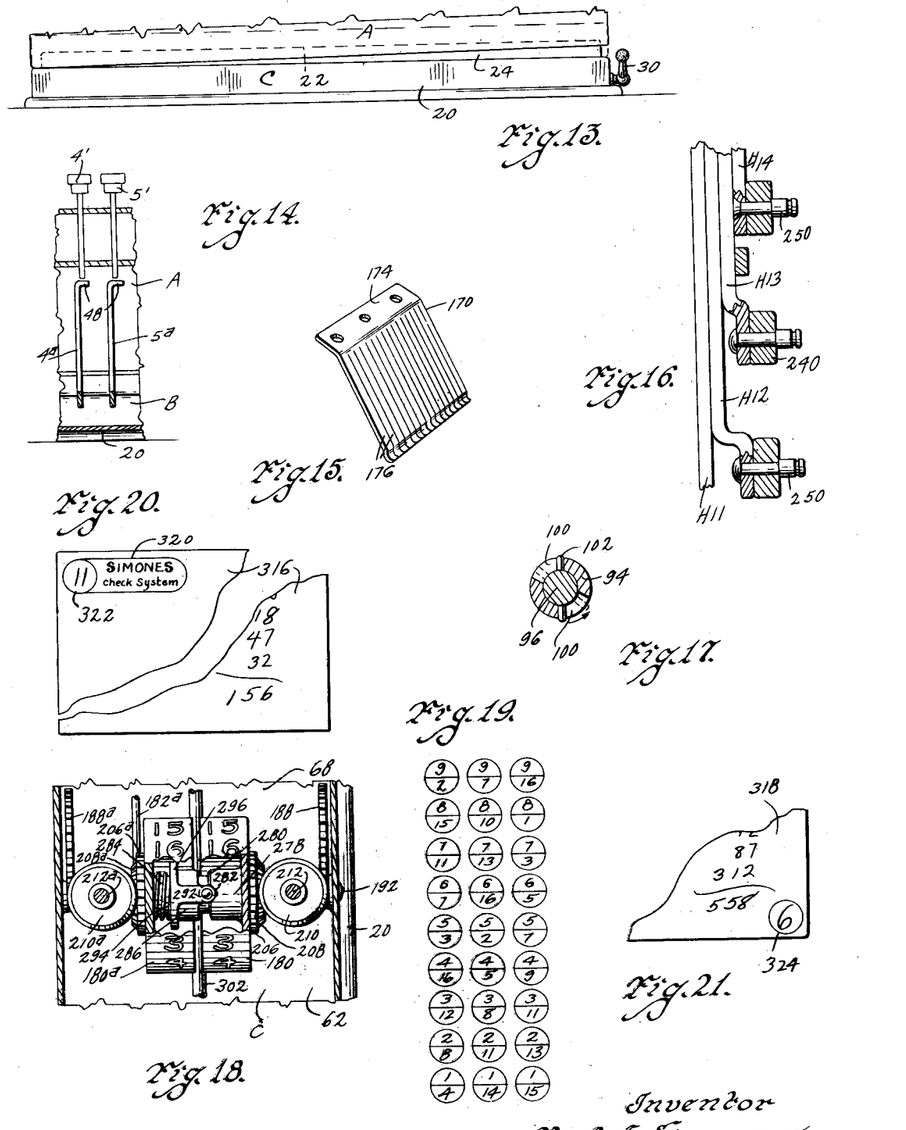
Figure 13 is a side elevation of the lower portion of the adding machine mounted on the sub-base of the checking mechanism, showing how it may be slightly raised from the sub-base to render the checking mechanism inoperative relative to the adding machine.
Figure 14 is a sectional view on the line 14—14 of Figure 2, illustrating the relation between the amount keys of the adding machine and parts of the checking mechanism which they engage when being depressed.
Figure 15 is a perspective view of a leaf spring construction used in my mechanism.
Figure 16 is an enlarged sectional view on the line 16—16 of Figure 5, illustrating details of parts of the manual checking mechanism.
Figure 17 is an enlarged sectional view on the line 17—17 of Figure 5, illustrating a lost motion connection.
Figure 18 is a sectional view on the line 18—18 of Figure 8, illustrating details of construction of cooperating parts in the primary and check dials.
Figure 19 is a chart showing the check numbers for the amount keys of the adding machine illustrated in Figure 1.
Figure 20 illustrates a bill or statement showing one method of applying a check number thereto.
Figure 21 illustrates a portion of a bill or statement showing another way of applying a check number thereto.

The spring device 170 as clearly illustrated in Figure 15 comprises an attaching flange 174 and a plurality of individually movable resilient fingers 176. The spring device 168 is of quite similar construction, the spring fingers in the two devices being used for pressing against the individual primary stop levers F and the individual check operating levers respectively.

The primary dial actuating arm 94 has an arm 178 formed integrally therewith for operating the primary check dial 180. The arm 178 is operatively connected by a link 182 to a sector lever 184 extending upwardly through a slot 186 in the partition 62. The sector lever 184 terminates in a toothed gear sector 188, the teeth of which are normally disengaged from a pinion 190 (see Figure 5), but which are adapted to engage the teeth of the pinion 190 for rotating the same.

The sector 188 is mounted for oscillation on a supporting shaft 192. The pinion 190 is secured to a primary dial shaft 194 extending into the primary check dial 180, as clearly shown in Figure 6 and 8.

The shaft 194 is provided with an actuating pawl 196 adapted to engage ratchet teeth 198 formed on the primary check dial 180. The dial 180 is adapted to be rotated by the sector 188 through the medium of the pinion 190 and the pawl 196 a given number of units, depending on which of the primary stop levers F are raised.

Upon return of the sector 188, a ratcheting action takes place for leaving the dial 180 at the position to which it has been brought by the sector 188.

The primary check dial 180 is held in such position by a holding pawl 200 actuated by a spring 202 for causing a roller 204 thereon to engage teeth 206 formed on the primary check dial 180.

A means is provided for manually rotating the dial 180 to any desired position for corrective purposes and such means consists of a bevel gear 208 formed on the check dial and a bevel gear 210 coacting therewith. The bevel gear 210 is secured to a shaft 212 rotatably extending upwardly through a bearing supported by the top of the checking machine casing and a manually operable knob 214 is secured to the shaft 212 on the outside of the machine.

A glass insert 216 provides for the operator observing one of the check numbers, which are distributed around the primary check dial 180, as clearly shown in Figure 18.

*Manual checking mechanism*

The manual checking mechanism of my checking machine includes a plurality of checking keys, 0, 1, 2, 3, 4, 5, 6, 7, 8, 9, 10, 11, 12, 13, 14, 15, 16. These checking keys are manually operable independent of those on the adding machine A and each is secured to a key stem 218 slidably extending through the top of the checking machine C and through a bracket plate 220.

Each key stem 218 is held in raised position by a spring 222 with a lug 224 on the post 218 acting as a key stem. Slidably mounted on the upper surface of the bracket plate 220 is a lock plate 226 normally held in predetermined position by a spring 228.

A slot 230 is provided in the lock plate 226 for each key stem 218 of the checking keys.

Each key stem 218 is provided with a notch 232, a bevel lug 234, and an elongated notch 236. The lower end of each key stem 218 with the exception of the one for the 0 checking key is inclined to form a cam face 238.

A roller 240 is mounted below each key stem 218 to be engaged by its respective cam face 238 on the post when the post is being moved toward its downward limit of motion.

Each roller 240 is mounted on a manual stop bar $H^1$, $H^2$, etc., * * * $H^{16}$. The connection between the rollers 240 and the stop bars H is best illustrated in Figure 16 of the drawings. The stop bars H are slidably mounted in bearings 242 extending upwardly from the partition 62. Each stop bar H is provided with an upwardly projecting pin 244 adapted to normally engage a stop rod 246 stationarily supported relative to the partition 62.

The stop bars H are constrained to such normal position by springs 248, each having one end connected with a roller post 250 extending through one of the rollers 240 and secured to its respective bar H and each having its other end connected with a stationary post 252 extending upwardly from the partition 62.

It will be remembered that the primary stop levers F are raised when the amount keys of the adding machine are pressed, while the manual stop bars H are slid longitudinally whenever a checking key is pressed.

The effect in each instance is the same, since the proper stop lever or bar as the case may be, is moved into the path of movement of the primary dial actuating arm 94 or the manual dial actuating arm $94^a$. The arms 94 and $94^a$ are actuated in a similar manner by similar mechanism and accordingly, does not need to be described in detail.

On the drawings, parts of the manual checking mechanism corresponding to similar parts of the primary checking mechanism are given the same reference numeral with the addition of the distinguishing character "a".

The clutch lever $124^a$ of the manual checking mechanism is operatively connected by a rod $132^a$ to a lever $134^a$ secured to a shaft $136^a$. The shaft $136^a$ is supported in bearings extending downwardly from the partition 62 while the rod $142^a$ is mounted across the top of the bars H in a manner similar to the rod 142 across the levers F, but since the bars H slide instead of being raised, the arrangement is a little different, as clearly disclosed in Figure 5.

The pin 244 on any of the bars H which are moved by pressing the checking keys of the checking machine will cause swinging motion of the arm $134^a$ for operating the clutch of the primary checking mechanism in a manner similar to the clutch for the primary checking mechanism.

A shaft 254 is mounted in a bearing 256 supported by the partition 62 and has arms 258 and 260 secured thereto. The arm 258 is provided with a pin 262 adapted to be engaged by the manual dial actuating arm $94^a$ when in a certain position. The lever 260 is operatively connected by means of a link 264 with a catch lever 266.

The catch lever 266 is secured to a catch shaft 268 having a catch 270 thereon. The catch 270 is adapted to receive a resilient finger 272, one of which is provided on each stop bar H.

Figure 11:
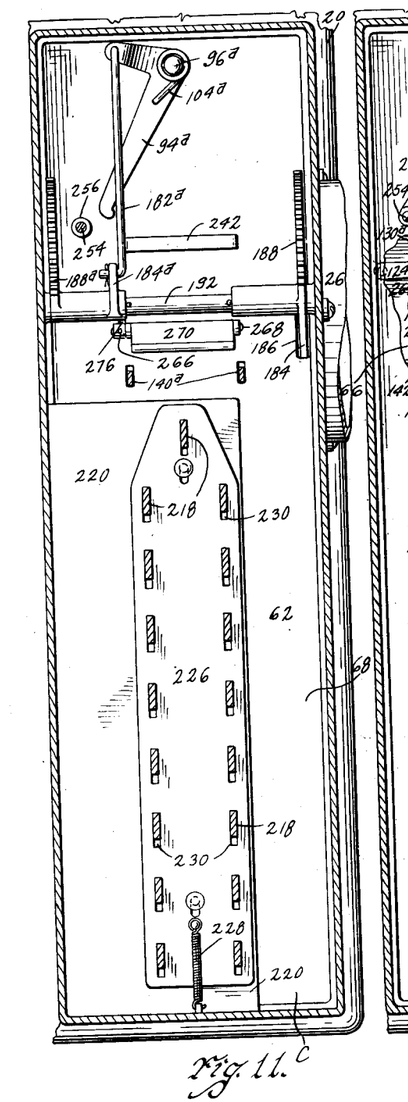
Figure 11 is a sectional view on the line 11—11 of Figure 2, illustrating a lock plate for the checking keys.
Figure 12:
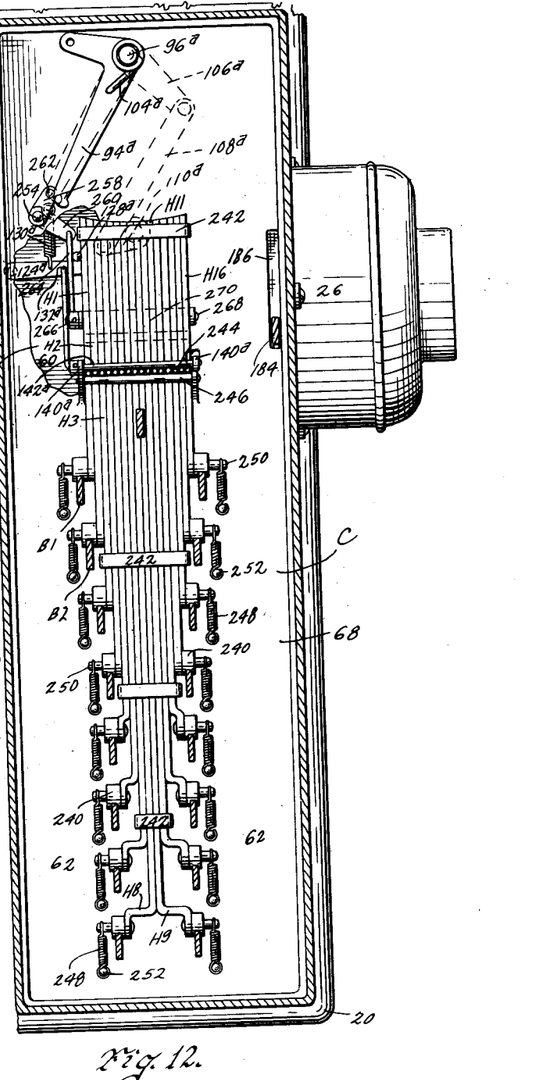
Figure 12 is a sectional view on the line 12—12 of Figure 2, illustrating details of construction of the manual check mechanism.

It will be noted that the catch 270 extends completely across and is located below the stop bars H, (see Figures 5, 11 and 12.) A spring 274 normally constrains the catch 270 toward the position shown in Figure 5 with the catch arm 266 engaging one end of a slot 276 formed in the partition 62, as best shown in Figure 11.

The details of construction of the manual check dial 180ª and its cooperating parts are similar to those of the primary check dial 180 and have been given similar reference numerals with the addition of the distinguishing character "a".

Certain exceptions in the construction, however, are now to be described. The primary check dial 180 is provided with a hub 278 having a cam surface 280 provided with a cam notch 282. The manual check dial 180ª is provided with a hub 284 on which is slidably mounted a sleeve 286.

A key 288 and keyway (see Figure 8) is provided for slidably but non-rotatably mounting the sleeve 286 relative to the hub 284. The sleeve 286 is provided with an arm 290, on which is journaled a cam roller 292 adapted to coact with the cam face 280 and the cam notch 282.

A spring 294 is provided between one end of the dial 180ª and the sleeve 286 to normally constrain the roller 292 to engage the cam surface 280 and notch 282.

A flange 296 is provided on the sleeve 286 and a lock roller 298 is normally constrained to engage the flange 296. The lock roller 298 is mounted on an arm 300, which in turn is secured to a lock shaft 302. The lock shaft 302 is suitably supported relative to the casing of the checking machine so that it can rock in bearings. The lock shaft 302 is provided with a lock arm 304 having a spring 306 secured thereto for holding the lock roller 209 normally in engagement with the flange 296.

The upper end of the lock arm 304 extends through a slot 308 in the top of the checking machine C and has pivotally connected therewith, lock rod 310. The lock 310 slidably extends through an ear 312 and is adapted to engage under the adding bar 314 of the adding machine when the lock shaft 302 is rocked to a predetermined position.

Practical operation

The easiest way to explain the practical operation of my checking mechanism for adding machines is to state a problem and show just how the machine works in adding amounts.

Taking the two bills illustrated in Figures 20 and 21 and bearing the reference numerals 316 and 318 it will be noted that two amounts, namely 156 and 558 appear as the totals or the amounts to be added.

A small design 320 may be printed in the upper left hand corner of all bills, statements and the like to indicate that a particular check system was used in determining the check number 6, indicated at 322. If found more convenient, the check number may be located at 324 (see Figure 21).

The importance of indicating the check system used will hereinafter be more fully set forth.

Both the primary checking mechanism and the manual checking mechanism are in reality, adding devices which rotate the dials 180 and 180ª predetermined units of a single rotation and thus subsequent partial rotations add the indicating numerals indicated on the peripheries of the dials, these numbers repeating if they reach 16, by beginning again at 0.

Thus, the check number for any given amount is always of small denomination, being from 0 to 16 inclusive.

Obviously, this simplifies the use of the manual checking mechanism, since but one key need be pressed for each checking number and not a plurality of keys as when three would have to be pressed on the adding machine for entering the number 156 on the machine.

Since the checking mechanisms are adding devices it will be obvious that entering the number 156 on the adding machine will cause the automatic check dial 180 to add the three check numbers 4, 2 and 5 (this can be determined from the chart shown in Figure 19 for the purpose of clarifying the use of the system in this description). The total of 4, 2 and 5 is 11, and consequently, the primary check dial 180 will show 11, the manual check dial 180ª being still at 0, to which position it would have to be placed before starting the adding operations.

Following through the operations caused by depressing the amount key 1' of the adding machine, the check operating lever 1ª is rocked upon its pivot shaft 56. This causes the corresponding resilient arm 76 (which will be indicated as 76ª for purposes of following the operation through) to extend upwardly through its respective slot 88 in the trip plate 86 and engage the primary stop lever F⁴.

Referring to Figure 4, (wherein a different arm 76 is illustrated, but operates in the same manner) the arm 76 will move upwardly to the dotted line position shown for moving the lever F⁸ upwardly to the dotted line position. In the case of the arm 76ª, the lever F⁴ will be moved upwardly in this manner. The notch 80 provides a clearance to insure that the upper end of the arm 76 will not accidentally engage the lower corner of the lever F⁷ and move it upwardly also.

Such upward movement of the stop lever F⁴ causes the free end thereof to assume a position above the free ends of the other stop levers F where it is in the path of movement of the primary dial actuating lever 94.

Such movement of the stop lever F⁴ is opposed by its respective spring finger 176, the corresponding movement of the check operating lever for the amount key 1' being opposed by its respective spring finger of the spring 168.

In the adding machine A, locking means (not shown on the drawings) is provided for holding each of the amount keys in its lowered position so that it will be seen the arm 76¹ will be held in a raised position for keeping the stop lever F⁴ in raised or stop position.

Such upward movement of the stop lever F⁴ to stop position will raise the rod 142 for pulling the clutch lever 124 away from the stop 128, whereby the pin 116 may engage in one of the openings 118 in the worm gear 120.

The worm gear 120 of course is continuously rotating during operation of the checking machine. Such release of the pin 116 will cause the crank arm 110 to rotate for oscillating the arm 106 and consequently the shaft 96. Oscillation of the shaft 96 will, through the action of the spring 104, cause the primary dial actuating arm 94 to swing from the position shown in Figure 7 to a position with the free end thereof contacting with the stop F⁴. The shaft 96 will continue in its movement, the pin 102 merely moving through the slot 100 without causing any further movement of the arm 94.

Movement of the arm 94 to engage the stop lever F⁴ will cause the sector 188 to move first to a position engaging the pinion 190 and then continue to a stationary position after four teeth of the sector have engaged four teeth of the pinion 190 and rotated the primary check dial 180 four units of its seventeen units per revolution.

As the shaft 96 returns, the pin 102 will engage one end of the slot 100 for carrying the arm 94 away from the stop F⁴ to the dotted line position shown in Figure 7 and then continue slightly to the full line position shown. When the arm 94 moves to the dotted line position, the arm 144 causes the trip plate 86 to be moved in a right hand direction, as indicated by the arrow in Figure 4 for swinging any arm 76 extending upwardly through the plate 86 to the full line position shown.

The notch 82 provides clearance for such movement without interfering with the next lever F⁹. When the arm 76 is moved to the full line position it will be obvious that the lever F⁸ will return to normal position, due to the action of its respective spring 176 (or in the example under consideration, the lever F⁴ will be released).

Then, as the arm 144 returns to the full line position shown in Figure 7, the trip plate 86 will return to its original position, the slot 88 allowing for such return regardless of whether or not one or more of the arms 76 are projecting upwardly through the plate 86.

It will be noted that the lock bar 164 is shown in stop position in Figure 2. That is, it acts as a stop for each of the check operating levers. As the arm 94 swings to the right from its normal position, however, it will allow the spring 166 to swing the arm 158 against the base 20. This causes the lock bar 164 to enter the notches 52 in each check operating lever (with the exception of the lever 1ª, the right hand end of which will be raised so that the lock bar 164 will swing under the projection below the notch 52), whereby any other amount key on the adding machine pressed before the cycle of operation of the primary check mechanism has been completed, will be locked in a raised position until the arm 94 assumes its normal position, whereupon the lock bar 164 will again be unlocked, as shown in Figure 2.

Thus, it will be seen that pressing the amount key 1' will cause the primary check dial 180 to register 4. By repetition of these operations, pressing the amount key 5'' will add 2 to the 4, making the primary check dial 180 show 6. Then, pressing amount key 6''' will cause the check number 5 to be added to 6, so that the final check number of the amount 156 will show through the primary check glass 216, as being 11.

The next step in the operation rather than pressing the adding bar 314 of the adding machine A as is usually done, is to depress the proper checking key, as indicated in the circle 322 on the bill 316. The number appearing in the circle 322 is 11. Consequently, checking key number 11 is pressed, which causes the post 218 for the key 11 to move downwardly so that the cam surface 238 thereof engages its corresponding roller 240 for sliding a manual stop bar H¹¹ in a right hand direction, as viewed in Figure 5.

This causes the right hand end of the stop bar H¹¹ to assume a stop position in the path of travel of the manual dial actuating arm 94ª. Such movement causes the pin 244 on the stop bar H¹¹ to move away from the stationary stop rod 246 and to move the rod 142ª for allowing the spring pressed clutch pin 116ª to engage in one of the openings 118 in the worm gear 120. This causes the crank arm 110ª to rotate for moving the arm 94ª to engage the stop bar H¹¹, whereupon the number 11 will show up through the glass insert 216ª.

It will now be noted that both check dials are in registry with each other. When in such registry, the cam roller 292 engages in the notch 282 of the cam surface 280 so that the lock rod 310 assumes the position shown in Figure 2. Whenever the check dials are not in registry the lock rod extends under the adding bar 314 on the adding machine to prevent depression thereof.

Thus, it will be seen that any mistake made in the amount or the check number when entered on the adding machine and the checking machine respectively will cause a locking action to prevent depression of the adding bar 314 and the operator will know that he has just made a mistake and he can correct it as hereinafter described.

The amount 558 is then added by manipulating the adding machine and the checking machine in a manner similar to that already described, in which event the check numbers 3, 2 and 1 (total of 6) will be added on the primary check dial 180, thus bringing the total on such dial from 11 to 0. Since the dial is divided into seventeen parts, 6 added to 11 will equal 17, or 0, the lowest number on the dial being 0.

Incidentally, if the total of 156 and 558, which is 714, is now struck off on the adding machine by successively pressing the amount keys 7′, 1″ and 4‴, it will be seen by observing the automatic check dial 180 that 11, 14 and 9 will be successively added thereon, making two complete revolutions of the dial 180 and bringing it back to 0, which indicates that the final check number of any plurality of amounts when added together is identical with the check number of such amounts.

By the system I have devised, this is always true and out of some hundreds of problems I have worked, it has never been otherwise.

Correction

Several types of mistakes may be made in entering amounts on the adding machine or entering check numbers on the manual checking mechanism and I will herewith enumerate these and show how they can be corrected.

One: Mistake in transferring amount from bill to adding machine. When this occurs, (assuming that both check dials are originally in registry with each other before making the mistake) the wrong check number will show up on the primary check dial 180. Then, when the correct check number is transferred from the bill to the checking mechanism the two dials will not register and the adding bar 314 cannot subsequently be pressed. The operator will instantly know that he has made a mistake of some kind and will check back to see what kind of a mistake he has made. The checking key last pressed will be in a lowered position so that he will know which one he has pressed.

It is held in such lowered position as shown in Figure 5 by the upper edge of the lock bevel lug 234 engaging beneath the lock plate 226, as shown by the key 11. If he sees that he has transferred the correct check number, then he knows that his mistake is in the amount and can see what amount he has put down by observing the amount keys of the adding machine which are held down by the locking mechanism therein.

A correction in the amount can then be made by pressing the correction key 326 of the adding machine A, which merely raises all of the depressed amount keys. He may then manipulate the checking key 6 to subtract 11 from the showing on the manual check dial 180ª to bring it back to the same position it was before the mistake was made. (The small number 11 adjacent the key 6 indicates that the key 6 may be pressed for subtracting 11 from the showing on the manual check dial 180ª, which in reality, adds 6 thereto, but results in the proper number showing up on the dial.)

Then, by rotating the primary check dial knob 214, the primary check dial 180 may be made to coincide with the manual check dial 180ª. The arrows 328 and 328ª indicate the proper direction to rotate the knobs 214 for rotating the check dials in a forward direction.

The operator may then strike off the proper amount on the adding machine and restrike the proper checking key, whereupon, he can continue with his column of addition.

Two: Mistake in transferring check number from bill to checking machine. When such a mistake occurs, the operator can instantly tell what the last number was that he pressed on the checking machine C, as the checking key therefor will be depressed. He can then add or subtract to correct the checking amount, by manipulating the proper checking keys according to the indicia thereon for adding and according to the small numbers adjacent the keys, as shown in Figure 1, for subtracting.

The manual check dial knob 214ª can also be used for this purpose if desired.

Three: Mistake in check number entered on bill. When this occurs and the amount and check number are properly transferred from the bill to the adding and checking machines, the lock rod 310 of course will be moved to position under the adding bar 314 to prevent depression thereof. The operator can then check back on his last entry on the machines to tell whether he has made them properly or not, according to the bill. If he has, he then knows that the mistake is due to whoever entered the check number on the bill, making a mistake in such entry.

The operator can then determine the proper check number by merely reducing the manual check dial to 0 by manipulating the knob 214, then striking off the amount of the bill on the amount keys of the adding machine, which will show the proper check number which should have been entered on the bill. He can then correct such entry, press the correction key 326, manipulate the knob 214 for returning the primary check dial 180 to register with the manual check dial 180ª and then continue adding his column of amounts.

The use of a checking mechanism of this character on an adding machine is quite obvious and it is especially desirable in the adding of columns of figures for trial balances.

Every bookkeeper knows that if he adds a column of a hundred or so amounts and cannot get the total to agree with the other side of his books, that a mistake causing such a disturbance in the balance is usually very difficult to find and many cases are known where much time has been spent in finding it and other cases, where the mistake never has been found.

In adding a matter of a hundred amounts, if the books do not balance, then the tedious process of finding which of the amounts is wrong must be gone through.

By the use of a checking mechanism as herein disclosed, the operator knows the instant a mistake has been made and can check back to find what is wrong with such checking operation, taking in many instances, no more than a minute's time. Thus, he does not have to check back through a whole column of amounts to find just which one is in error.

By the use of an indicating design 320 printed on all bills, statements, etc., as shown in Figure 20, bills and the like received from all over the country may bear the same check number as indicated from a checking machine using the system herein disclosed. Thus, a bookkeeper at one point can help a bookkeeper at the other, since the check number is already determined when one receives a bill from the other.

My device is adaptable to all types of adding machines, as all adding machines are provided with amount keys and it is merely necessary to devise the proper mechanism for connecting the check operating levers with the amount keys of the adding machine so that depression of any of the keys will operate the proper automatic stop lever. Since it is merely necessary to connect with the amount keys of the machine, many of the operating parts of the adding machine have been omitted in the drawings, as being immaterial.

Although the chart in Figure 19 illustrates the system for three columns of amount keys, the same system can be carried further to include any number of columns and in the design of a checking machine for an adding machine having more keys, additional check operating levers would be provided, each having an arm 76 to cooperate with the proper stop lever F according to the proper check number for a given key in a given column.

Other systems wherein the check numbers differ from those I have disclosed can be used without substantially departing from the details of construction of the checking mechanism herein disclosed.

Instead of check numbers indicated on the dials 180 and 180ª, characters such as A, B, C, etc., can be used if desired.

Where an adding machine is provided with both a debit and a credit side, a double checking mechanism may be provided, one operated from the credit side and the other from the debit side of the machine. In such a device, the debit check dials may be provided with indicating numerals, while the credit dials may be provided with indicating characters or letters so that when a check numeral is shown on a bill, the operator will know that it is for the debit side of the machine, while a check character will indicate that the amount on such bill is for the credit side of the machine.

The lock plate 86 is of the particular construction disclosed because sometimes different amount keys in a certain amount must actuate the same lever F and thus a release must be provided so that a finger 76 holding the lever F in raised position may be caused to disengage such lever, since the amount key remains in depressed position while another one is being pressed.

In the manual checking mechanism, however, each check key operates its own individual stop bar H and may thereafter be raised. However, it is desired not to raise such check key, but leave it be pressed until another one is pressed so that the last check key which has previously been checked can be noted without having to remember which one was last pressed. Thus, if number 11 is pressed and a mistake is made so that the last number is to again be substracted, the depressed key 11 due to its lowered position, will indicate to the operator that the last number added on the manual check dial 180ª was 11.

In the construction of the shafts 194 and 194ª of the check dials, a pin 195 is provided for aligning these shafts relative to each other, (see Figure 8). This provides for proper alignment and yet being loosely mounted in the two shafts allows them to rotate independent of each other.

Throughout the specification and claims, I have referred to a "primary" and a "manual" checking mechanism merely to distinguish the two and the various parts comprising them from each other. As a matter of fact, both mechanisms are "manually" operable, the primary one being actuated automatically when the amount keys of the adding machine are manipulated and the manual one when the check keys are manipulated independent of the adding machine amount keys. As far as the operation of my check mechanism is concerned, it is immaterial whether the primary dial or the manual check dial is rotated first and it is therefore to be understood that the word, "primary", is not to be construed as a limitation indicating that the primary dial must be actuated first to accomplish the results sought.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with an adding machine having a plurality of amount keys, a checking structure comprising primary adding mechanism, means for operatively connecting such mechanism with each of said amount keys whereby the mechanism is actuated a predetermined amount each time a key is pressed, a manually actuated adding mechanism and checking keys associated therewith whereby the last mentioned mechanism may be actuated independent of said amount keys by manually pressing said checking keys, said primary and manual adding mechanisms actuating adjacent elements which cooperate with each other to indicate mistakes in the use of the adding machine and the manually actuated adding mechanism.

2. In combination with an adding machine having a plurality of amount keys, a checking structure comprising primary adding mechanism, means for operatively connecting such mechanism with each of said amount keys whereby the mechanism is actuated a predetermined amount each time a key is pressed, a manually actuated adding mechanism, checking keys associated therewith whereby the last mentioned mechanism may be actuated independent of said amount keys by manually pressing said checking keys, means for operatively associating said adding mechanisms with each other and a locking device actuated by said mechanisms for preventing operation of the adding machine except when said mechanisms check with each other.

3. In combination with an adding machine having a plurality of amount keys, a checking structure comprising primary adding mechanism, means for operatively connecting such mechanism with each of said amount keys whereby the mechanism is successively actuated for adding a plurality of predetermined amounts each time a series of keys are pressed, such amounts being at variance with the amounts indicated on said amount keys.

4. In combination with an adding machine having a plurality of amount keys, a checking structure comprising primary adding mechanism, means for operatively connecting such mechanism with each of said amount keys whereby the mechanism is successively actuated for adding a plurality of predetermined amounts each time a series of keys are pressed, such amounts being at variance with said amounts indicated on said amount keys, the amounts actuated adding mechanism, a manually actuated adding mechanism, checking keys associated therewith whereby the last mentioned mechanism may be actuated independent of said amount keys by manually pressing said checking keys, said checking keys having check numbers indicated thereon, said manually actuated adding mechanism, when a checking key is pressed, being actuated an amount corresponding to that indicated on such key, said primary and manually adding mechanisms actuating adjacent elements which cooperate with each other to indicate mistakes in the use of the other adding machine and the manually actuated adding mechanism.

5. In combination with an adding machine, a checking machine comprising an adding mechanism primarily actuated by operating the adding machine and another adding mechanism to be manually actuated independent of the operation of the adding machine said first and second adding mechanisms actuating adjacent elements which cooperate with each other to indicate mistakes in the use of the adding machine and the manually actuated adding mechanism.

6. In combination with an adding machine, a checking machine comprising an adding mechanism, primarily actuated by operating the adding machine, another adding mechanism to be manually actuated independent of the operation of the adding machine, said adding mechanisms being operatively associated with each other and with the adding machine to prevent predetermined operations of the adding machine except when said mechanisms check with each other.

7. In combination with an adding machine, a checking machine comprising a primary adding mechanism actuated by operating the adding machine, another adding mechanism to be manually actuated independent of the operation of the adding machine, and a locking device for the adding bar of the adding machine to prevent depression thereof except when the adding mechanisms check with each other.

8. In combination with an adding machine having a plurality of amount keys, a checking machine comprising a primary checking mechanism associated with said adding mechanism and operated thereby upon depression of any of said amount keys and a manual checking mechanism including checking keys, said manual checking mechanism being operated upon depressing any of said checking keys, said primary and manual adding mechanisms actuating adjacent elements which cooperate with each other to indicate mistakes in the use of the adding machine and the manually actuated adding mechanism.

9. In combination with an adding machine having a plurality of amount keys, a checking machine comprising a primary checking mechanism associated with said adding machine and operated thereby upon depression of any of said amount keys and a manual checking mechanism including checking keys, said manual checking mechanism being operated upon depressing any of said checking keys, said mechanisms being operatively associated together and with the adding machine to prevent operation of the adding machine when the checking mechanisms do not coincide with each other.

10. In combination wth an adding machine having a plurality of amount keys, a checking machine comprising a primary checking mechanism including a primary check dial associated with said adding machine and operated thereby upon depression of any of said amount keys and a manual checking mechanism including checking keys, and a manual check dial, said manual checking mechanism being operated upon depressing any of said checking keys, said dials being operatively associated together and a lock device for the adding machine operated to locking position through such association when the dials do not coincide with each other.

11. In combination with an adding machine having a plurality of amount keys, a checking machine comprising an automatic checking mechanism including an automatic check dial associated with said adding machine and operated thereby upon depression of any of said amount keys and a manual checking mechanism including checking keys, and a manual check dial, said manual checking mechanism being operated upon depressing any of said checking keys, a cam carried by one of said dials, a coacting cam member carried by the other of said dials and movable relative thereto and a lock device for the adding machine operated by said cam and cam member.

12. In combination with an adding machine having a plurality of amount keys, a checking mechanism comprising a dial, means for actuating the same a predetermined number of units of one revolution each time an amount key is pressed, such number of units being at variance with the number indicated on the amount key, a plurality of check keys, a second dial adapted to be actuated the same number of units indicated on any particular checking key depressed, a lock for the adding machine, said dials being associated together for operating said lock when the dials are not in registry.

13. In combination with an adding machine having a plurality of amount keys, a checking mechanism comprising a dial, means for actuating the same a predetermined number of units of one revolution each time an amount key is pressed, such number of units being at variance with the number indicated on the amount key, a plurality of check keys and a second dial adapted to be actuated the same number of units indicated on any particular checking key depressed.

14. In combination with an adding machine having a plurality of amount keys, a checking mechanism comprising a dial, clutch and stop means for actuating the same a predetermined number of units of one revolution each time an amount key is pressed, such number of units being at variance with the number indicated on the amount key, a plurality of check keys, a second dial adapted to be actuated by a clutch and stop means the same number of units indicated on any particular checking key depressed, a lock for the adding machine, said dials being associated together for operating said lock when the dials are not in registry.

Des Moines, Iowa, June 5, 1929.

PAUL J. SIMONES.